United States Patent [19]

Casse

[11] Patent Number: 4,978,324

[45] Date of Patent: Dec. 18, 1990

[54] TORSION DAMPING DEVICE WITH PERIPHERAL RESILIENT MEANS, ESPECIALLY FOR AUTOMOTIVE VEHICLES

[75] Inventor: Pierre Casse, Ermont, France

[73] Assignee: VALEO, Paris, France

[21] Appl. No.: 313,517

[22] Filed: Feb. 22, 1989

[30] Foreign Application Priority Data

Feb. 23, 1988 [FR] France ................................ 88 02143

[51] Int. Cl.⁵ ........................ F16D 3/12; F16D 47/02
[52] U.S. Cl. ..................................... 464/68; 192/106.2
[58] Field of Search .................. 192/3.28, 3.31, 106.2; 464/24, 66, 67, 68

[56] References Cited

U.S. PATENT DOCUMENTS

| | | | |
|---|---|---|---|
| 4,318,283 | 3/1982 | Windish | 464/68 |
| 4,588,058 | 5/1986 | Aliouate | 192/106.2 |
| 4,674,991 | 6/1987 | Tojima | 464/24 |
| 4,689,954 | 9/1987 | Billet | 464/68 X |
| 4,697,417 | 10/1987 | Billet et al. | 464/68 X |
| 4,716,998 | 1/1988 | Tsukamoto et al. | 464/67 X |
| 4,728,314 | 3/1988 | Eckel et al. | 464/24 X |
| 4,739,866 | 4/1988 | Reik et al. | 464/68 X |
| 4,788,884 | 12/1988 | Reik et al. | 464/68 X |
| 4,848,551 | 7/1989 | Caspar | 192/106.2 |

FOREIGN PATENT DOCUMENTS 0043641  1/1982  European Pat. Off. .
0073286  3/1983  European Pat. Off. .
2175067 11/1986  United Kingdom .

Primary Examiner—Stanley N. Gilreath
Assistant Examiner—William G. Battista, Jr.
Attorney, Agent, or Firm—Charles E. Brown; Charles A. Brown

[57] ABSTRACT

A torsion damping device, particularly for use with automotive vehicles and of the kind comprising a support structure (11) mounted on a wheel member, e.g. a flywheel (1). The flywheel is fixed to a first shaft (A) by first fastening devices (2), and a hub (12), secured to a second shaft (B) for rotation therewith. The hub is coupled with the support structure (11) through resilient springs (14). The support structure (11) constitutes one (22) of the components (22, 23) of a sealed casing (20), which is at least partially filled with a lubricant fluid and which is secured on the flywheel by second fastening devices (21) located radially outwardly of the first fastening devices (2). The casing (20) carries and encloses a torsion damper (15) having peripheral resilient springs (14A, 14B).

8 Claims, 3 Drawing Sheets

TORSION DAMPING DEVICE WITH PERIPHERAL RESILIENT MEANS, ESPECIALLY FOR AUTOMOTIVE VEHICLES

FIELD OF THE INVENTION

The present invention is concerned generally with torsion damping devices, particularly for automotive vehicles, where the damping device is of the kind comprising a support means mounted on a wheel member which is secured to a first shaft, and a hub which is secured to a second shaft for rotation therewith, the hub being coupled to the support means or springs through circumferentially acting resilient means.

BACKGROUND OF THE INVENTION

A device of the general kind defined above is described in European published Patent Application No. EPO 073 286A, in which the torsion damping device is interposed in the drive train from the engine of the vehicle to the road wheels, upstream (i.e. on the driving side) of a variable speed drive or transmission unit of the variable pulley type. The support means or springs of the damping device is fixed to guide rings of a conventional torsion damper, with its hub being fixed with respect to the damper plate of the damper itself.

In that type of construction the resilient means operate in the atmosphere, so that they are in a polluted environment. Most commonly the components of a conventional torsion damper are used, for example those of a friction clutch.

There are severe constraints on the overall axial length available for the accommodation of this type of damping device between the wheel member, such as a flywheel, and the forward face of the variable speed transmission unit.

This is primarily because of the presence of the fastening member securing the wheel member to its shaft, and of the bearing in front of the transmission unit.

This is especially true since, because this type of damping device needs to be so arranged as to undergo large angular displacements as between the hub and its support means (in particular so as to obtain effective suppression of vibrations), there is no incentive to arrange the resilient means or springs so that they extend over a relatively large circumferential length, thereby elongating them. For large angular displacements, the longer the resilient means (springs) are made, the more they will be deformed. In other words they are compressed to a greater extent, especially by centrifugal force. The result is that the springs suffer greater wear in contact with the elements in which they are housed. This efect is increased still further by the radial movements which occur between the damper plate and the support means.

SUMMARY OF THE INVENTION

An object of the present invention is to mitigate the above disadvantages, i.e. to reduce the overall axial length of the torsion damping device, without reducing its useful service life, besides producing other advantages.

According to the invention, a torsion damping device of the kind set forth above is characterised in that the support means constitute one component of a sealed casing, which contains a lubricant, the sealed casing being fixed to the wheel member by fastening means which are located radially outwardly of the other fastening means or springs whereby the wheel member is secured to its shaft, with the said casing carrying and enclosing a torsion damper of a kind having peripherally extending resilient means.

The invention enables the resilient means or springs to be located further away from the axis of rotation of the device than before, so that the axial length of the assembly can be reduced in its central region while the resilient means or springs are protected by the lubricant and are subjected to reduced wear.

It will also be noted that this arrangement, by providing lubrication for the springs, favours a reduction in the noise set up by axial movements of the crankshaft of the vehicle engine.

It will be appreciated that the torsion damper is protected from any pollution by the ambient environment, and that its operating characteristics will remain stable over a period of time.

The casing may preferably comprise two of the said components, or casing members, which are sealingly nested one within the other.

According to another feature of the invention, the said casing is fastened by one of its casing members to the wheel member radially inwardly of the resilient means. This minimises any tendency of the casing to "inflate", i.e. to expand axially due to the fluid forces exerted internally by the lubricant during rotation.

The fastening means by which the casing is secured to the wheel member preferably extend through spacers which connect the transverse walls of the casing sealingly together.

It is thus possible to close the casing by means of the splined hub, and thus to construct a module which can then readily be secured on the wheel member.

It will be appreciated that, because of the presence of the lubricant and the location of the resilient means, the inertia of the damping device itself is enhanced. If necessary, the thickness of the wheel member itself may even be reduced.

It is thus possible to employ a torsion damper of the kind described in U.S. Pat. No. 4,697,417 (European published Patent Application No. EP 0 182 710A), which was originally intended for a hydraulic coupling, but which is designed also to have in its central region a low axial length.

Preferably, the type of damper used in the device of the present invention is that shown in FIG. 28 of European published Application No. EP 0 182 710A, with the guide ring having an axial projection secured to the base of the casing by sealing rivets, through lugs formed in the inner periphery of the guide ring. It is then easy to fit spacing rings between the said arms of the damper plate and those of the damper counter plate.

It will be noted that the generally tortuous or serpentine shape of the central part of the damper, as seen in cross-section, makes it possible to avoid any fouling of the various fastening elements.

The description which follows explains the invention, by way of example, with reference to the accompanying drawings.

DESCRIPTION OF THE PREFERRED EMBODIMENTS

Figure 1:
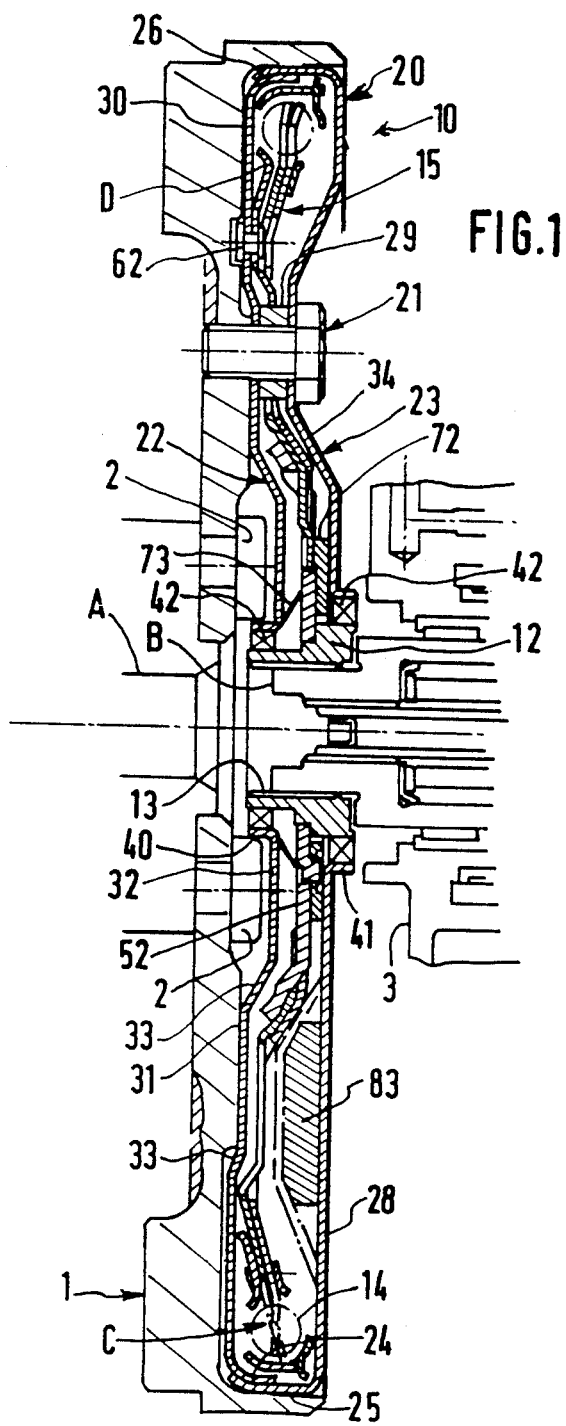
FIG. 1 is a view in axial cross-section of the torsion damping device according to the invention.

Referring firstly to FIG. 1, this shows a radial plate 1 which constitutes a flywheel or inertia wheel. The flywheel 1 is secured to the crankshaft A of the engine of the automobile by means of first fastening means, in the form of members 2 which in this example are studs or bolts.

A secondary shaft is indicated by the reference B. In this example this shaft is coupled to a drum of a clutch (not shown) which is associated with a transmission of the variable pulley type. This clutch and transmission are contained in a variable speed drive unit, having a casing part of which is indicated at 3.

A torsion damping device 10 is arranged in the drive train to the drive unit 3, between the crankshaft A and the secondary shaft B. The torsion damping device 10 includes a support 22 which is mounted on the flywheel 1, and a hub 12 which is secured to the secondary shaft B for rotation therewith, in this example by means of a splined connection 13. The hub 12 is coupled to the support 22 through circumferentially acting resilient means 14 which form part of a torsion damper 15.

In the torsion damping device 10, the support 22 constitutes one of the parts of a sealed casing 20, which is filled with a lubricant and which is secured on the flywheel 1 by second fastening means 21 which are arranged radially outside the first fastening members 2. The casing 20 carries, and encloses, the torsion damper 15 with its peripheral resilient means 14. The above mentioned lubricant may consist of oil, grease or any other suitable viscous fluid.

The casing 20 comprises two casing members, namely the support 22 and casing member 23. These are mated one within the other, and are secured to each other in a sealing manner radially outwardly of the resilient means 14. In this example the latter comprise circumferentially acting coil spring.

Each of the support 22 and casing member 23 has a peripheral, axial flange, 24 and 25 respectively. The flange 25 overlies the flange 24, and is in intimate contact with it to ensure the fluid tightness of the casing 20, as can be seen at 26 in FIG. 1. It will be noted that the support 22, and the terminal edge of the flange 25 are preferably curved for this purpose.

The casing 20, is in this example, fixed to the flywheel 1 radially inwardly of the springs 14 and outwardly of the screws 2.

Each of the support 22 and casing member 23 has a transverse wall 28, 30–32 respectively, delimiting the casing 20. The walls 28 and 30–32 are connected to each other through spacers 29. In the embodiment shown in FIG. 1, the spacers 29 are in the form of washers through which the studs 21, i.e. the above mentioned second fastening means, extend. The washers 29 are fixed and sealed by being welded to the walls 28 and 30–32. It will be noted that the flywheel 1 has threaded holes for the studs 21.

The casing transverse wall of the support 22 is of serpentine cross-section, having three transverse wall portions 30, 31 and 32 offset axially from each other and connected through inclined portions 33. The wall portion 30 carries the flange 24 and is spaced axially from the flywheel 1. The wall portion 31 is in contact with the flywheel 1 and serves for fixing the casing member 22; while the wall portion 32 is the furthest from the flywheel 1 and is clear of the fasteners 2.

The casing transverse wall 28 of the casing member 23 is provided with recessed portions 34, which serve to reinforce the wall 28 and to accommodate the heads of the studs 21. Each recessed portion 34 has a flat central portion for contact with the rings or washers 29. As can be seen from FIG. 1, the recessed portions 34 generally lie facing the wall portions 31 of the casing member 22 and the casing 20 is at its narrowest in this region.

The casing walls 28 and 31–32 are extended by means of axially extending flange portions 40 and 41 respectively. The flange portions 40 and 41 are radially offset from each other, with sealing joints 42 interposed between them and the hub 12.

Figure 5:
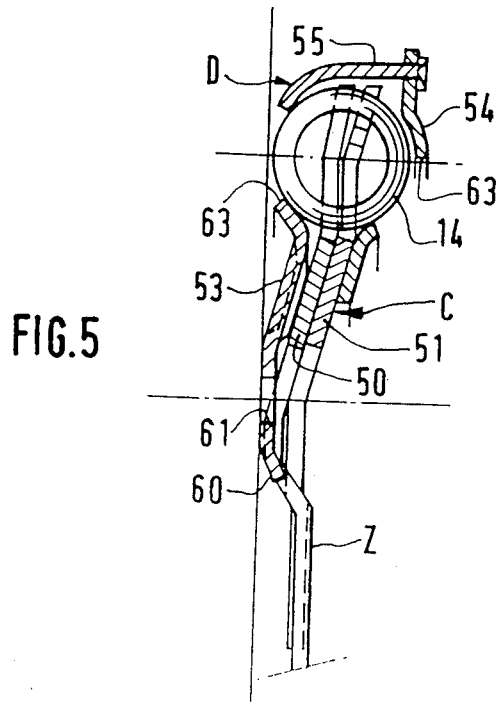
FIG. 5 is a view in axial cross-section showing part of a peripheral region of the damper.

The torsion damper is of the same type as that described in U.S. Pat. No. 4,697,497 (European published Patent Application No. EP 0 182 710A). It comprises two coaxial parts C and D which are mounted so as to be rotatable with respect to each other within the limits of a predetermined angular displacement and against the action of the springs 14. The first damper part C (FIG. 5) comprises a damper plate 50 and a damper counter plate 51, each of which is an annular member surrounding the hub 12. Each of these plates 50 and 51 also engages with a radial intermediate plate 52 which is secured to the hub 12 by welding. A coupling means (to be described later herein) is provided whereby the intermediate plate 52 couples the hub 12 with the damper plate 50 in such a way as to define a circumferential clearance for initial relative rotational displacement as between the hub 12 and damper plate 50. When the assembly is in a rest condition, the arrangement is such that this coupling means is in circumferential abutting engagement when rotation is in one circumferential direction; while a similar coupling means between the hub 12 and the damper counter plate 51, again defining a circumferential clearance for initial relative rotational displacement, is in similar circumferential abutting engagement when rotation is in the opposite direction. The part D of the torsion damper includes two guide rings 53 and 54, FIG. 5, extending obliquely to the radial direction and lying on either side of the damper plate 50 and damper counter plate 52. The guide ring 53 has an axial extension 55 which is formed with tenons engaging in mortices of the guide ring 54.

Figure 3:
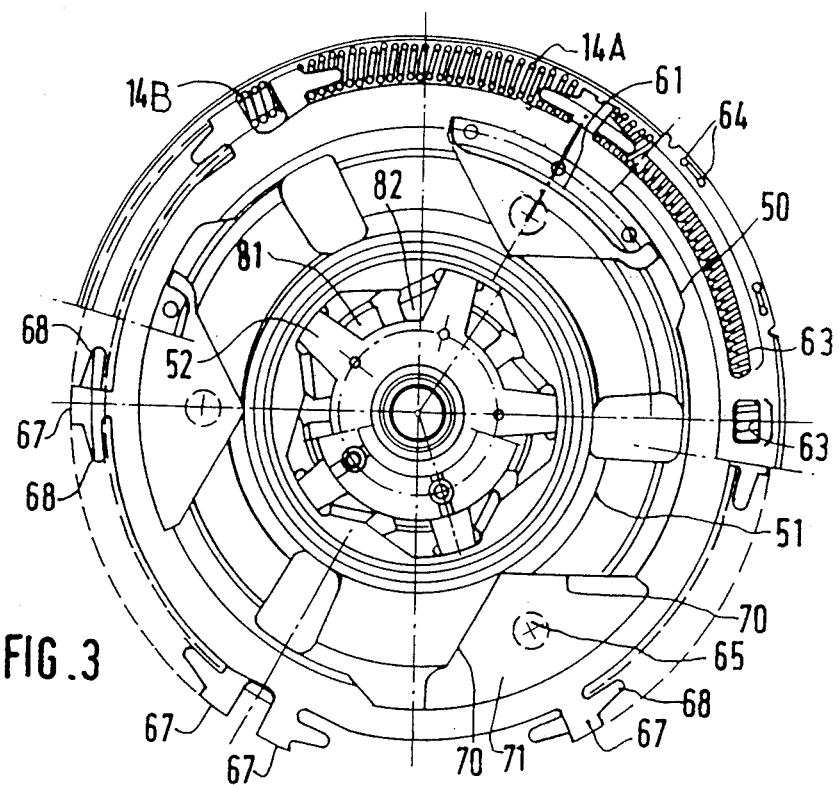
FIG. 3 is a view of the torsion damper seen in elevation, on a smaller scale and with certain parts locally cut away.

Assembly of the guide rings 53 and 54 is carried out by placing at least one of the edges of the tenon on the mortices as shown at 64 in FIG. 3. The extension 55 acts as a spacer between the two guide rings 53 and 54, while the guide ring 53 constitutes a securing ring for the damper.

Figure 4:
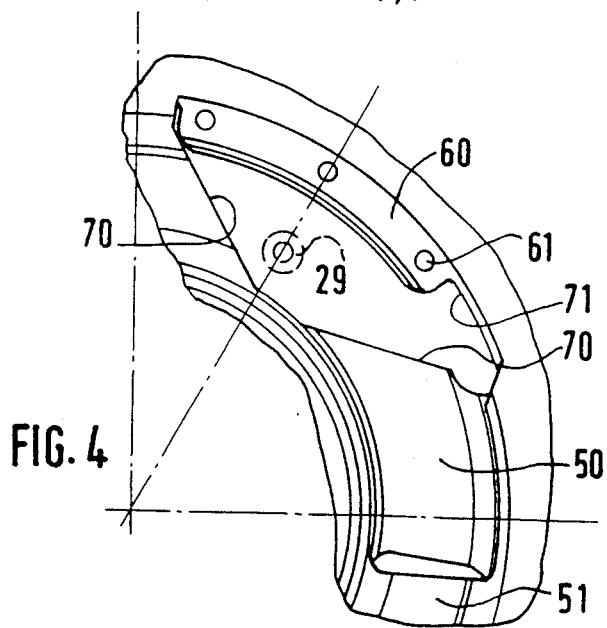
FIG. 4 is a partial view which shows the position of a damper plate and damper counter plate of the torsion damper, after a certain angular displacement has taken place.

The guide ring 53 has a plurality of lugs 60 (FIG. 4 and 5) disposed radially outwardly of the spacers 29. In this example there are three of these lugs 60, equally spaced apart circumferentially and having fixing holes 61, through which rivets 62, FIG. 1, extend so as to secure the guide ring 53 sealingly to the portion 30 of the casing wall 30–32. The flywheel 1 is recessed opposite the rivets 62. The guide ring 53 is thus secured to the casing 20 radially outwardly of the spacers but inwardly of the springs 14.

The springs 14 include springs 14A of relatively low stiffness and springs 14B of greater stiffness, disposed around the periphery of the damper and all lying on a single pitch circle of the assembly. They are retained by being disposed, without clearance, in through openings 63 formed in the guide rings 53 and 54, with radial arms 67, formed on the damper plate 50 and damper counter plate 51, acting on the springs. As can be seen from FIG. 3, each of these arms 67 acts either on a relatively low stiffness spring 14A or on a high stiffness spring 14B. The arms 67 have projecting fingers 68 for retaining the springs 14A.

The damper plate 50 and the damper counter plate 51 together define an intermediate zone of interpenetration Z. In each of these plates, engagement portions or arms 70 are disposed alternately with openings 71, the arrangement being the same for both plates 50 and 51. The spacers 29 lie in the open zone between two consecutive arms 70 of the damper plate 50 and damper counter plate 51, in line with the securing lugs 60. The axes of the spacers 29 are indicated at 65 in FIG. 3.

The damper plate 50 and damper counter plate 51 have lines along which they are bent. More precisely, these lines follow a tortuous or serpentine pattern, with an inclined peripheral portion and a generally transverse zone Z of interpenetration connected through an inclined portion to a second interpenetration zone which is also generally transverse and which is described below.

The intermediate plate 52, as described in the above mentioned published European Patent Application No. EP 0 182 710A, has at its outer periphery a continuous circular shroud, with openings for cooperating with teeth 81 and 82 formed on the damper plate 50 and damper counter plate 51 respectively. These elements constitute the aforementioned coupling means which allow some relative rotational displacement, respectively between the hub and the plate 50, and between the hub and the plate 51.

The two plates 50 and 51 are axially trapped between the peripheral shroud of the plate 52 and a ring 72 which is riveted to the inner periphery of the plate 52.

The torsion damper 15 can be assembled as a self-contained unit comprising the guide rings 53 and 54 and the hub 12.

Assembly of the torsion damping device 10 is carried out in the following manner, with the support 22 being first laid flat so as to rest on its wall portion 30. The damper 15, by means of its hub 12, is fitted in the joint 42 carried by the flange 40, until the guide ring 53 comes into abutting engagement against the wall portion 30 of the support 22. The guide ring 53 is then sealingly riveted on the support 22, by means of the securing lug 60 and rivet 61, after which the spacers 29 are positioned. Each spacer 29 is preferably provided with a ring of solder or weld metal at each of its ends.

The casing member 23 is now offered up to the spacers 29 by fitting the former over the hub 12, and the soldering or welding of the spacers 29 is then carried out. Next, the flanges 24 and 25 are mated together (at 26, FIG. 1) to complete the sealed casing 20.

Finally, the casing 20 is partially filled with lubricant, for which purpose one of the joints 24 can be left till last so that it can serve as the filling point for the lubricant.

The spacers 29 can of course be positioned beforehand on the support 22 with the use of an adhesive or light soldering.

In this way, a sealed module is constructed, which is secured by means of the studs 21 on to the flywheel 1. It only remains after this to introduce the splined secondary shaft B into the splined hub 12.

The torsion damping device 14 operates in the same way as that described in the above mentioned European published Patent Application No. EP 0 182 710A. Nevertheless, it will be noted that the ring 72 rubs against the casing, and more precisely against its wall 28, which thus acts as a friction surface. If necessary, this friction may be enhanced by the provision of a Belleville washer as indicated diagrammatically at 73 in FIG. 1.

It will be recalled that the teeth 81 and 82 of the damper plate 50 and counter plate 51 (FIG. 3) engage with each other in the region of the intermediate plate 52, so reducing the axial bulk of the assembly, with the counter plate 51 driving the damper plate 50 and vice versa through the teeth 81 and 82. It will also be noted that the peripheral portion of the inertia flywheel 1 is used as a housing for the torsion damper 15.

The inertia can if necessary be augmented, and the casing member 22 be provided with a continuous circumferentially extending reinforcing means having an identical shape in transverse cross-section to the recesses 34. This is indicated in phantom lines in the lower half of FIG. 1. Masses 83, FIG. 1, can for this purpose be arranged circumferentially between the studs 21. In a modification. separate blocks 83 may be replaced by a continuous mass which is actually secured by the studs 21.

The present invention is of course not limited to the embodiment described. In particular, the spacers 29 may be secured by a suitable adhesive instead of by soldering or welding. The flanges 24 and 25 may be adhered together or connected in a sealing manner by means of a ring of weld metal or solder, or by the use of bolted joints. In addition, a different type of damper with peripheral springs may be chosen.

Figure 2:
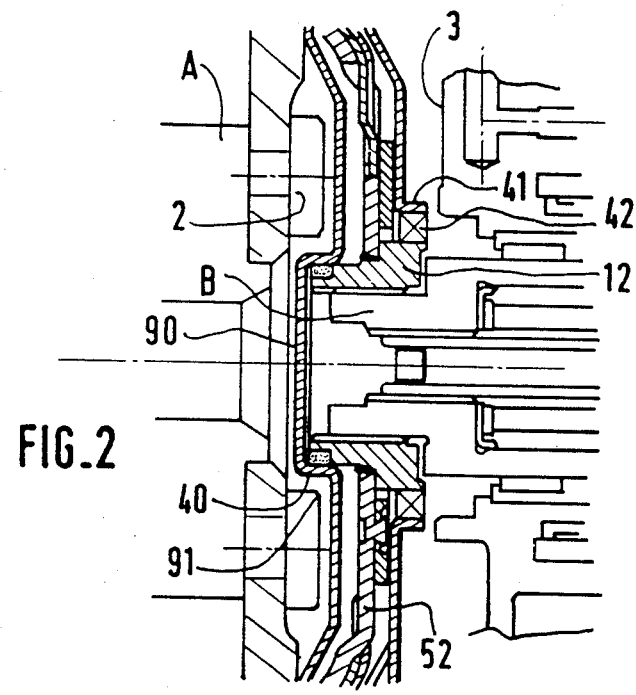
FIG. 2 is a partial view in axial cross-section, showing another embodiment.

Referring now to FIG. 2, in the modified version of the assembly there shown, the support 22 is not open at the centre. In this embodiment, it has a central portion 90 which is offset axially towards the wall portion 30 of support 22. The central portion 30 is fitted over the hub 12, with a toroidal seal 91 carried by the hub at the interface.

The casing 20 may be connected to a second flywheel, for rotation with it, and the second flywheel may constitute the reaction plate of the clutch, which may be arranged either inside or outside the variable speed drive unit. In this case the casing may form part of a double damped flywheel.

The flywheel 1 may have gudgeons or trunnions extending through the spacers 29, and which are secured to the casing by means of screws which take the place of the studs 21.

Finally, the casing may alternatively be secured to the flywheel by means of bolts passing through the flywheel 1 and the spacers 29.

What is claimed is:

1. A torsion damping device comprising a support means mounted on a wheel member and forming a support for a torsion damper, first fastening means for securing the wheel member to a first, a hub, means for securing the hub to a second shaft for rotation therewith, said torsion damper having peripherally extending resilient means for coupling the hub with the support means, wherein the device further comprises a sealed casing delimited by transverse walls with the support means constituting one of said transverse walls with the support means constituting one of said transverse walls of the casing, a lubricant fluid filing the casing at least partially, second fastening means securing the casing to the wheel member and being located radially outwardly of said first fastening means and inwardly of said resilient means, spacers being arranged between said transverse walls and being connected in a sealing manner to said transverse walls, said torsion damper being carried by and enclosed by said casing and said second fastening means extending through said spacers.

2. A device according to claim 1, wherein one of said transverse walls of the casing has recesses, the seonc fastening means being located in said recesses.

3. A device according to claim 2, wherein the torsion damper includes two guide rings connected together and the torsion damper is carried by said casing and is secured to the latter by one of its said guide rings serving as a securing ring for the damper.

4. A device according to claim 3, wherein said securing ring is fastened to the support means of said casing radially outwardly of the spacers.

5. A device according to claim 4, wherein the torsion damper comprises a damper plate and a damper counter plate each of which has a plurality of arms disposed alternately with openings, with said plates interpenetrating in a zone of interpenetration and each of said spacers is disposed in the open zone between two consecutive arms of said damper plate and said damper counter plate.

6. A device according to claim 3, wherein said securing ring has a plurality of lugs disposed radially outwardly of the spacers equally spaced apart circumferentially and having fixing holes through which rivets extend so as to secure said securing ring sealed to the support means.

7. A device according to claim 1, wherein said casing is delimited by two transverse walls, each having a peripheral axial flange nesting one within the other and secured sealing to each other radially outwardly of said resilient means.

8. A device according to claim 1, wherein the spacers are in the form of washers through which said second fastening means extends.

* * * * *